United States Patent
Garcia-Lorenzana et al.

(10) Patent No.: US 9,206,725 B2
(45) Date of Patent: Dec. 8, 2015

(54) FLANGE EQUIPPED WITH A HEATING ELEMENT

(75) Inventors: Ignacio Garcia-Lorenzana, Frankfurt am Main (DE); Stephane Leonard, Brussels (BE); Frédéric Jannot, Bousval (BE); Laurent Etorre, Schaerbeek (BE)

(73) Assignee: INERGY AUTOMOTIVE SYSTEMS RESEARCH (Société Anonyme), Brussels (BE)

( * ) Notice: Subject to any disclaimer, the term of this patent is extended or adjusted under 35 U.S.C. 154(b) by 979 days.

(21) Appl. No.: 12/965,398

(22) Filed: Dec. 10, 2010

(65) Prior Publication Data

US 2011/0155742 A1    Jun. 30, 2011

(30) Foreign Application Priority Data

Dec. 24, 2009   (EP) .................................... 09180726

(51) Int. Cl.
 *H05B 1/00*    (2006.01)
 *B21J 5/08*    (2006.01)
 *F01N 3/20*    (2006.01)

(52) U.S. Cl.
 CPC ........... *F01N 3/2066* (2013.01); *F01N 2610/02* (2013.01); *F01N 2610/10* (2013.01); *F01N 2610/1406* (2013.01); *Y02T 10/24* (2013.01)

(58) Field of Classification Search
 CPC ........ F16L 53/008; F24H 1/142; B29C 65/02
 USPC .......... 219/562, 201, 254, 255; 392/562, 201, 392/254, 255, 304, 320
 See application file for complete search history.

(56) References Cited

U.S. PATENT DOCUMENTS

| | | | |
|---|---|---|---|
| 3,239,401 A | 3/1966 | Beery | |
| 3,498,504 A * | 3/1970 | Wilkins | ..................... 222/146.3 |
| 4,390,776 A | 6/1983 | Yane et al. | |

(Continued)

FOREIGN PATENT DOCUMENTS

| | | |
|---|---|---|
| CN | 2872778 | 2/2007 |
| DE | 102008001280 A1 | 10/2009 |

(Continued)

OTHER PUBLICATIONS

Chinese Office Action with English Translation dated Jan. 6, 2014 in corresponding Chinese application No. 2010106057537.

(Continued)

*Primary Examiner* — Tu B Hoang
*Assistant Examiner* — Thomas Ward
(74) *Attorney, Agent, or Firm* — Oblon, McClelland, Maier & Neustadt, L.L.P.

(57) ABSTRACT

A flange (101) for holding a quantity of fluid within a tank, such flange being equipped with a heating element comprising at least one resistive wire (102) for conducting an electrical current and dissipating heat as an effect of said current, wherein the heating element further comprises guiding means (103), and wherein the at least one resistive wire (102) is guided at a plurality of separate locations along its length by the guiding means (103) to form a heating surface, wherein a first part of the heating surface is present inside the flange (101) and a second part of the heating surface is present outside the flange (101).

20 Claims, 3 Drawing Sheets

(56) References Cited

U.S. PATENT DOCUMENTS

| | | | |
|---|---|---|---|
| 8,052,634 B2 * | 11/2011 | Thommen et al. | 604/74 |
| 8,087,239 B2 * | 1/2012 | Bugos et al. | 60/298 |
| 2002/0040898 A1 * | 4/2002 | Von Arx et al. | 219/535 |
| 2004/0149733 A1 | 8/2004 | Abbott et al. | |
| 2008/0060845 A1 * | 3/2008 | Sawada | 174/84 R |
| 2010/0050606 A1 * | 3/2010 | Fulks et al. | 60/286 |

FOREIGN PATENT DOCUMENTS

| | | |
|---|---|---|
| GB | 2059730 A | 4/1981 |
| JP | S18-1500 | 2/1943 |
| JP | S36-7430 | 6/1961 |
| JP | 2854864 | 2/1999 |
| JP | 20010250663 A | 9/2001 |
| WO | WO 2008138960 A1 | 11/2008 |

OTHER PUBLICATIONS

Japanese Office Action issued Jan. 26, 2015, in JP Application No. 2010-283139 (with English Translation).

* cited by examiner

1

FLANGE EQUIPPED WITH A HEATING ELEMENT

CROSS-REFERENCE TO RELATED APPLICATIONS

This application claims priority to European application N° 09180726.3 filed on Dec. 24, 2009, the whole content of this application being incorporated herein by reference for all purposes.

TECHNICAL FIELD

The present invention relates to a flange for holding a quantity of fluid within a tank, said flange being equipped with a heating element comprising at least one resistive wire for conducting an electrical current and dissipating heat as an effect of said current.

BACKGROUND

Patent application WO 2008/138960 A1 in the name of applicant describes a urea tank and base plate with an integrated heating element. The integrated heating element comprises at least one flexible heating part. Preferably, the flexible part is a flexible heater, that is to say that it comprises at least one resistive track inserted between two flexible films or affixed to a flexible film.

The flexible part may be placed in a variety of positions, thus allowing the heating of parts of the tank that could not be reached by traditional heaters. However, the reach of the known heating element is still limited by the range of deformations that can be sustained without damage by the flexible part, and notably by the fact that the flexible part is an inherently flat two-dimensional sheet. Hence, the known flexible heater may well sustain bending or rolling, but it is not suited for describing a truly curved surface such as a hemisphere, nor for sustaining shear forces that would involve substantial compression or tension of the material making up the flexible film or films.

SUMMARY

It is an object of embodiments of the present invention to provide a heating element that overcomes the limitations of the known flexible heater, by providing the flexibility to describe substantially any curved surface.

This object is achieved by a flange for holding a quantity of fluid within a tank, said flange being equipped with a heating element comprising at least one resistive wire for conducting an electrical current and dissipating heat as an effect of said current, wherein said heating element further comprises guiding means, wherein said at least one resistive wire is guided at a plurality of separate locations along its length by said guiding means to form a heating surface, and wherein a first part of said heating surface is present inside said flange and a second part of said heating surface is present outside said flange.

In contrast to the cited prior art solution, the resistive wire comprised in the heating element of the flange according to the present invention is not being guided by one or more flexible sheets or films, which act to fixate substantially the entire length of the wire, but instead by discrete guiding means acting on a plurality of separate locations along the length of the wire.

It is an advantage of the present invention that the shape of the heating surface is not limited by the presence of the flexible film or films to which the resistive wire is attached. Rather, any chosen surface may be formed by guiding the resistive wire through the space to be heated, whereby the resistive wire is kept in place by guiding means.

In an embodiment of the heating element according to the present invention, the guiding means comprises a flexible net.

This embodiment has the advantage that the flexible net may first be positioned and fixed according to the desired heating surface, and that the resistive wire may be guided along the surface it is desired to describe by weaving it through the flexible net.

In another embodiment of the heating element according to the present invention, the guiding means comprises a plastic band.

This embodiment has the advantage that it allows a reliable fixation, and that more or less rigid bands may be used according to the desired flexibility of various parts of the heating surface after its mounting in position.

In a more particular embodiment, the plastic band is provided with clips adapted to receive and hold a part of said at least one resistive wire.

It is an advantage of clips that it is easy to place, remove, or replace the resistive wire therein.

In an embodiment of the flange according to the present invention, the at least one resistive wire is covered with an electrically insulating material.

It is an advantage of this embodiment that the heating element may be used while immersed in an electrically conductive fluid, without shorting out different parts of the resistive wire, and without compromising the electrical safety of the overall assembly.

In a preferred embodiment of the flange according to the present invention, at least one resistive wire is covered with a material resistant to urea.

It is an advantage of that embodiment that the heating element may be used while immersed in a volume of urea solution, such as the commercially available aqueous or formic solutions used in vehicular emission reduction systems. This embodiment may thus be used to heat a part of the urea solution tank in a motor vehicle to temperatures above the freezing point of the urea solution.

In an embodiment, the electronic controlling the heating element of the flange comprises self-controlling means adapted to vary the electrical current of a secondary heating zone.

In a more particular embodiment, the controlling means comprises a switch.

In another more particular embodiment, the controlling means comprises a resistor with a positive temperature coefficient inside said flange, the resistor forming a parallel electrical circuit with said second part of said heating surface.

It is an advantage of this particular embodiment that progressively less heat is dissipated inside the flange as the flange heats up, thus redistributing the consumed power to the region outside the flange.

In a preferred embodiment of the flange according to the present invention, the second part of the heating surface is substantially crinoline-shaped.

In another embodiment of the flange according to the present invention, the second part of said heating surface comprises a plurality of petals.

In an embodiment, the flange according to the present invention comprises fastening means for fastening said heating surface.

According to another aspect of the present invention, there is provided a tank comprising a flange as described above.

In a preferred embodiment, the flange is placed essentially at the bottom of said tank.

BRIEF DESCRIPTION OF THE DRAWINGS

Some embodiments of apparatus and/or methods in accordance with embodiments of the present invention are now described, by way of example only, and with reference to the accompanying drawings, in which.

DETAILED DESCRIPTION

Figure 1:
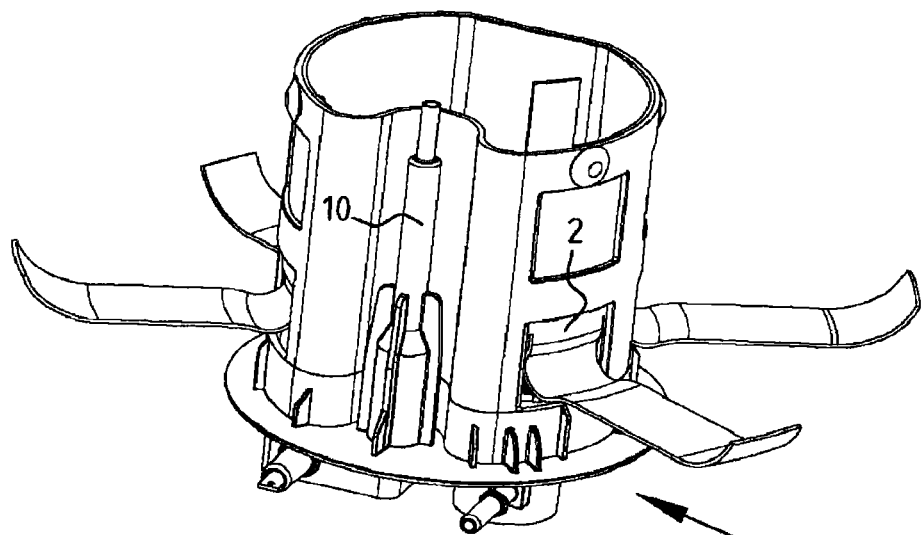
FIG. 1 illustrates a urea flange comprising a flexible heater according to the prior art.

FIG. 1 illustrates a urea tank and flange 1 with a flexible heating means 2 according to the prior art. Where the heating element 2 is used to avoid freezing in a vehicular fluid tank, such as a tank for holding a urea solution as used in an emission reduction system, an active accessory 10 of the storage and/or injection system is advantageously positioned within a flange 1. The active accessory 10 may comprise a pump, a level gauge, a temperature sensor, a quality sensor, a pressure sensor, a pressure regulator, or similar instruments. The flange 1 comprises a base plate or mounting plate, and a perimeter of any shape. By placing the active accessory 10 within the flange, the active accessory can be provided with the intended vehicular fluid as soon as the flange content has reached a sufficiently elevated temperature to ensure liquidity. For example, if the tank is intended for the storage of a eutectic water/urea solution, the flange content needs to be heated to −11° C., i.e. the melting temperature of such a solution.

Figure 2:
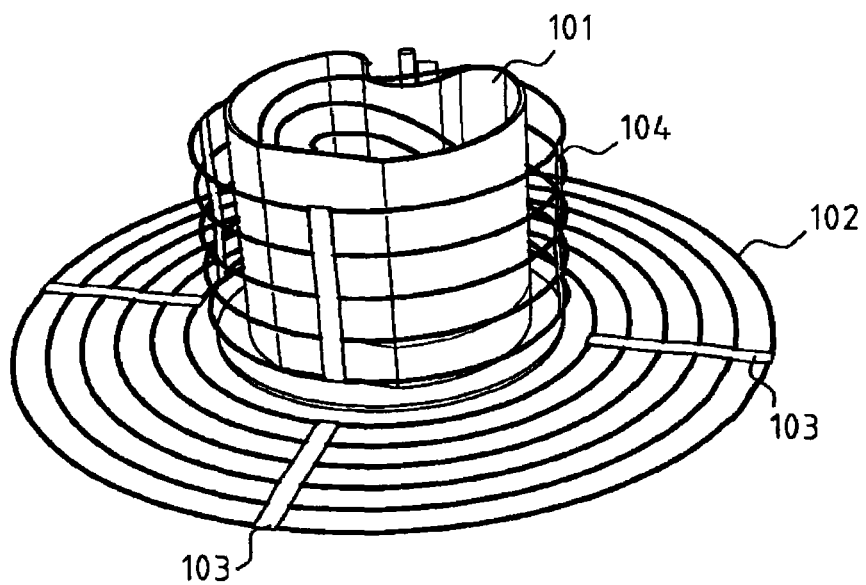
FIG. 2 illustrates an embodiment of a flange comprising a heating element according to the present invention.

FIG. 2 illustrates an embodiment of the flange according to the invention. The flange 101 shown in FIG. 1 may be a flange for heating part of the solution present in a vehicular fluid tank, such as a urea solution tank. Flange 101 is equipped with a flexible heating element, which comprises at least one resistive wire 102, which generates heat in response to an electric current. The resistive wire 102 may advantageously be formed out of a copper-nickel alloy or stainless steel.

The resistive wire is guided by guiding means 103 acting on several separate locations along the length of the wire, to define a heating surface, situated partly inside and partly outside the flange. In this manner, the substance inside the flange 101 may be heated to a temperature that guarantees liquidity, thus ensuring a sufficient availability of liquid substance to any active accessories that may be placed inside the flange 101, while the substance directly surrounding the flange 101 is already being pre-heated to supplement the quantity present inside the flange 101 when necessary.

In this embodiment, the guiding means 103 are plastic bands. Other guiding means are possible, including plastic or metallic nets. Metallic nets have the advantage of being self supporting and capable of conducting heat. The conductive wire 102 may itself be in the form of a metallic net.

In this embodiment, the guiding means 103 are applied in such a way that the second part of the resulting heating surface is substantially crinoline-shaped. For this shape, or other shapes with a substantially circular symmetry, the resistive wire 102 is bent along a spiraling path, or multiple lengths of resistive wire 102 are laid out in substantially concentric circles.

Other shapes may be formed in like manner. The surfaces thus created are not limited to planes and rolled up variations of a plane, but may exhibit curvature along several axes. Hence, for instance, spherical surfaces are possible.

The heating surface is attached to the flange 101 by fastening means 104 to ensure that it remains in place during use.

Figure 3:
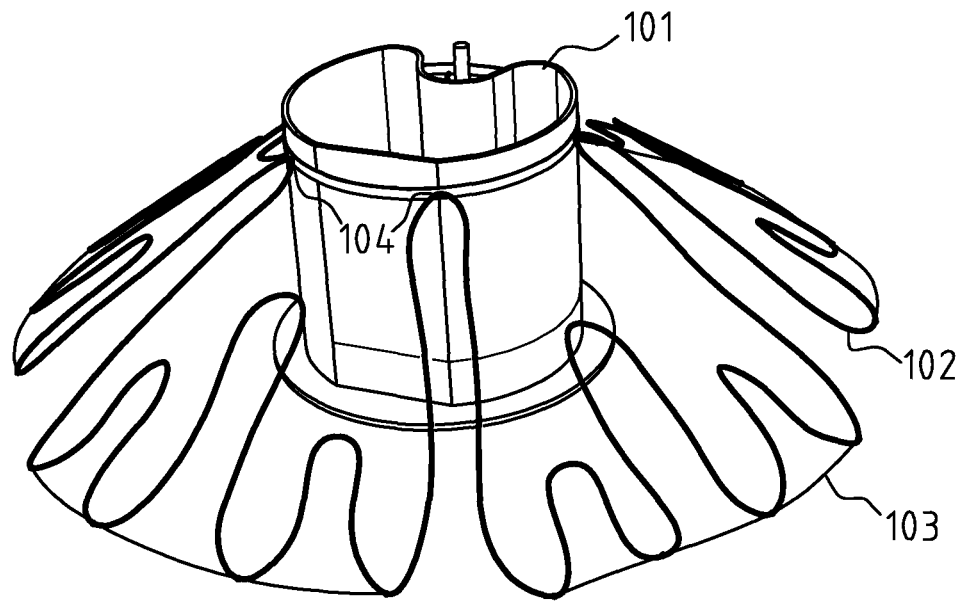
FIG. 3 illustrates another embodiment of a flange comprising a heating element according to the present invention.

FIG. 3 illustrates an alternative embodiment of the flange according to the invention. Using like reference numerals to refer to like elements, FIG. 3 depicts a flange 101, equipped with a flexible heating element. The flexible heating element comprises a resistive wire 102, guided by guiding means 103 to form a heating surface. The heating surface is attached to the flange 101 by means of fastening means 104.

In this embodiment, the guiding means 103 are applied in such a way that the second part of the resulting heating surface is substantially shaped as multiple petals fixed on the top of said flange 101.

Figure 4:
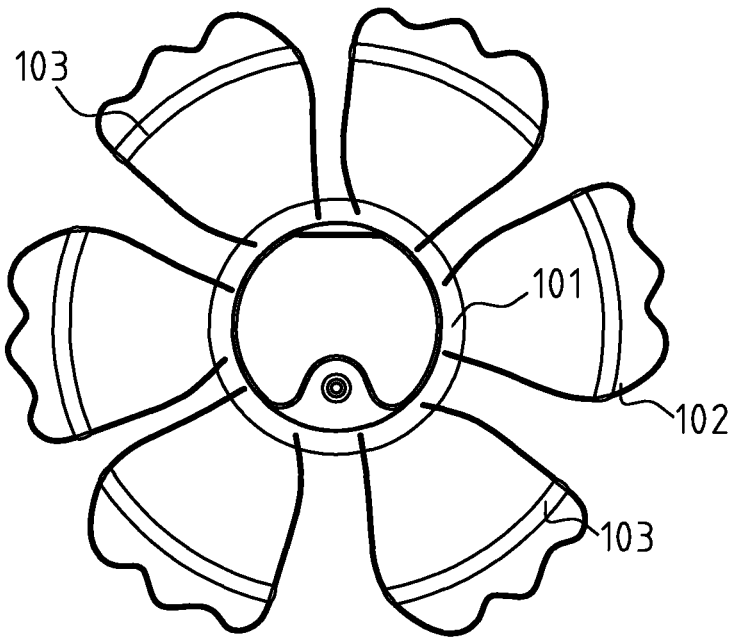
FIG. 4 is a schematic top view of yet another embodiment of a flange according to the present invention.

FIG. 4 is a schematic top view of yet another embodiment of a flange according to the invention. The flange 101 is surrounded by multiple petals out of resistive wire 102, each of which heats a sector of the area directly surrounding the flange 101. By providing guiding means 103 substantially at the outer edges of the petals, a well defined heating surface is obtained at these edges, while the axial movement of the petals is left unrestricted. This facilitates the mounting of the flange according to this embodiment into a larger tank.

Figure 5:
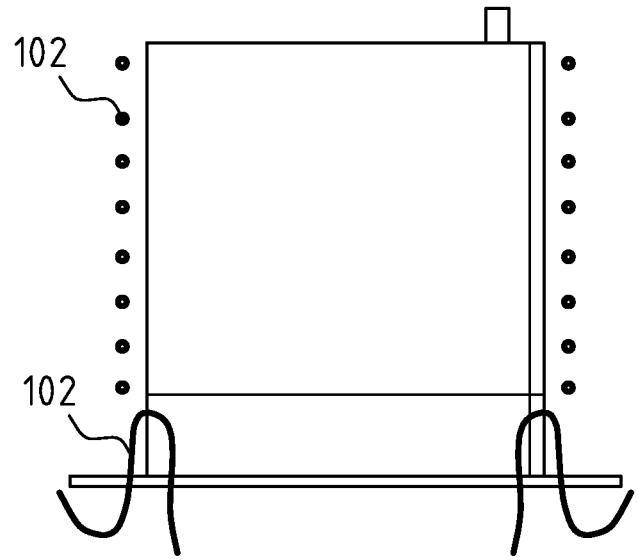
FIG. 5 is a sectional view of an embodiment of the flange according to the present invention.

FIG. 5 is a sectional view of an embodiment of the flange according to the present invention. Resistive wires 102 are shown both along the outer perimeter of the flange 101 and on the inside of the flange 101, where they are shaped in a way that concentrates large amounts of heat in the bottom area of the flange 101.

Figure 6:
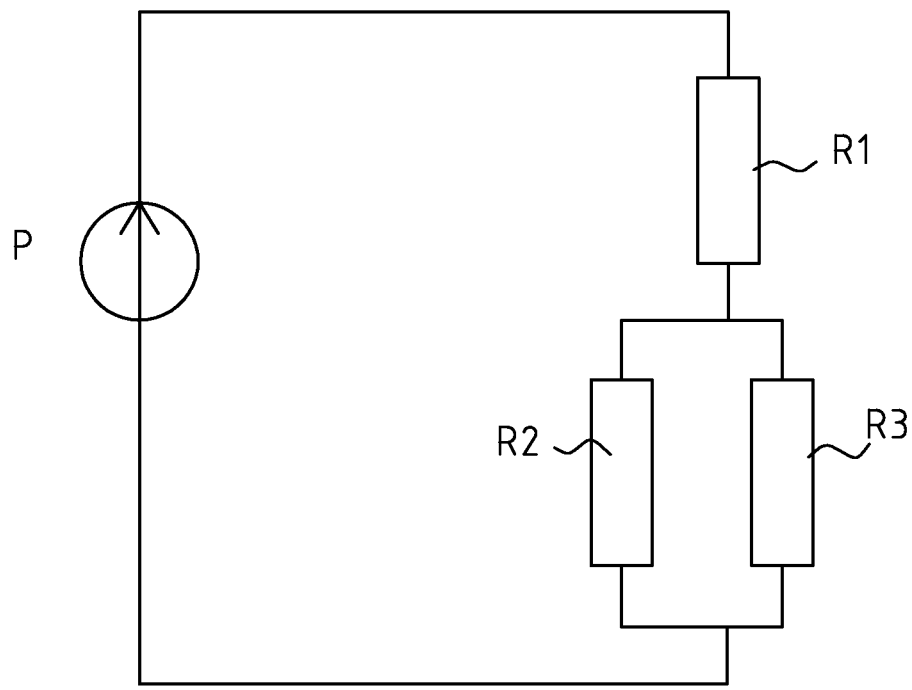
FIG. 6 is a schematic of the heating circuit of the flange according to the invention.

FIG. 6 is a schematic illustrating an advantageous electrical interconnection of the different parts of the heating element according to the invention. Power source P may be any suitable source of electrical current known to the skilled person. Resistor R1 represents a first length of resistive wire 102 present inside the flange 101, i.e. comprised in the first part of the heating surface as described above. Resistor R3 represents a second length of resistive wire 102 present outside the flange 101, i.e. comprised in the second part of the heating surface, integrated in the flange 101 (inside or outside the fluid) or in the electronic controlling the heating element. Element R2 is an element for controlling the distribution of power between the first and second part of the heating surface.

In an embodiment, element R2 may be a switch, or any suitable combination of components cooperating to act as a switch, which, when closed, shorts out resistor R3, thus preventing heating by the second part of the heating surface. It is an advantage of this embodiment that the heating element may be deployed in two phases: a first phase, with the switch R2 closed, in which only the inside of the flange 101 is heated to allow a rapid start of the systems that rely on the availability of heated or liquid substance, and a second phase, with the switch R2 open, during which the peripheral area outside the flange 101 is also heated.

In an embodiment, element R2 may be a resistor with a positive temperature coefficient, placed inside the flange. Element R2 may be comprised in the second part of the heating surface as described above. It is an advantage of this embodiment that the phases described above will now occur automatically and in a gradual fashion. As the inside of the flange 101 heats up, the resistance of element R2 increases, thus forcing an increasing fraction of the available current through resistor R3. The heating of element R2 corresponds to a gradual opening of a switch.

The flange according to the invention is advantageously mounted inside a tank, such as a vehicular fluid tank. For optimal operation, it is preferably placed at the bottom, or at least at a low point of the tank, where the bulk of the fluid would naturally be present due to the gravitational force. The second part of the flexible heating element is advantageously spread around the flange in a way that ensures supply of pre-heated fluid towards the flange.

Tentacles of the heating surface or lengths of resistive wire may extend into cavities or outlying regions of the tank, to avoid the long-term presence of frozen substance at these places.

Tentacles of the heating surface or lengths of resistive wire may also extend inside or around pipes and conduits that are part of the fluid transport system into and out of the tank, to avoid the blockage of these pipes and conduits by frozen substance.

In an embodiment, the heating surface is adapted to be foldable, preferable like an umbrella. This embodiment has the advantage that the heating element may be combined with a flange already present in a tank, by inserting the heating element into the tank in folded form, and deploying it inside the tank.

The use of the circuit of FIG. 6, in which R2 is a resistor with a positive temperature coefficient (PTC), is also advantageous in other types of heaters than the ones described above. In a generalized way, resistor R1 represents a first heating element, present inside a flange or on a mission-critical accessory such as a pump, and resistor R3 represents a second heating element, present outside the flange.

There is thus advantageously provided a flange for holding a quantity of fluid within a tank, said flange being equipped with a first resistive element R1 and a second resistive element R2 for heating a first part of said tank, and a third resistive element R3 for heating a second part of said tank, wherein said second resistive element R2 has a positive temperature coefficient, said second resistive element R2 and said third resistive element R3 forming a parallel circuit, and said first resistive element R1 being connected in series with said parallel circuit.

It is a further advantage of the circuit presented here, that the heater continues to operate when the PTC element reaches very high resistivity values, at a rate determined by the choice of resistors R1 and R3, instead of simply shutting off, as would be the case if the PTC element were placed in a series circuit with the other heating elements.

In an embodiment, the third resistive element R3 is positioned outside the flange, and the second resistive element R2 and the first resistive element R1 are positioned inside the flange. In a particular embodiment, the second resistive element R2 is positioned on an accessory of the tank. In a more particular embodiment, the accessory is a pump.

In an exemplary embodiment, R1 is substantially a 1Ω resistor, R3 is substantially a 3Ω resistor, and R2 is substantially a PTC element with a resistance of 1Ω at an initial low temperature, and a resistance of 3Ω at a subsequent working temperature. Applying a 12 V voltage source to the circuit as shown, the flange will initially receive 47.0 W of power from R1 and 26.4 W of power from R2, or 73.4 W in total. Upon reaching the working temperature, the flange will only receive 23.0 W from R1 and 17.3 W from R2, or 40.3 W in total. The rest of the tank will initially receive 8.8 W of power from R3, rising to 17.3 W when R2 reaches working temperature.

Hence, the circuit of FIG. 6 provides an inventive solution to the problem of prioritizing a certain part of a two-part heating system, regardless of whether it is combined with the main invention of the present application.

The invention has been described above in reference to certain exemplary embodiments. These embodiments are intended for illustrative purposes, and do not limit the invention, the scope of which is determined by the enclosed claims.

Should the disclosure of any patents, patent applications, and publications which are incorporated herein by reference conflict with the description of the present application to the extent that it may render a term unclear, the present description shall take precedence.

The invention claimed is:

1. A flange comprising:
   a container to hold a quantity of a fluid within a vehicular tank, said quantity of said fluid being part of the fluid present in the tank; and
   a heating element including at least one resistive wire to conduct an electrical current and dissipate heat as an effect of said current, wherein
   said heating element further includes a plurality of guides, wherein said at least one resistive wire is guided at a plurality of separate locations along a length of the at least one resistive wire and about the container by said plurality of guides to form at least one heating surface, and wherein at least a first part of said at least one resistive wire is guided inside said container to heat the fluid inside the container, a second part of said at least one resistive wire is guided outside and along an external wall of said container to heat the fluid surrounding the container, and a third part of said at least one resistive wire is guided outside and around a base of said container.

2. The flange according to claim 1, wherein at least one of said plurality of guides comprises a flexible net.

3. The flange according to claim 1, wherein at least one of said plurality of guides comprises a plastic band.

4. The flange according to claim 3, wherein said plastic band is provided with clips adapted to receive and hold a part of said at least one resistive wire.

5. The flange according to claim 1, wherein said at least one resistive wire is covered with an electrically insulating material.

6. The flange according to claim 1, wherein said at least one resistive wire is covered with a material resistant to urea.

7. The flange according to claim 1, wherein said plurality of guides are made of a material resistant to urea.

8. The flange according to claim 1, further comprising a controller adapted to selectively supply electrical current to said second and third parts of said at least one resistive wire.

9. The flange according to claim 8, wherein said controller comprises a switch.

10. The flange according to claim 8, wherein said controller comprises a resistor with a positive temperature coefficient inside said flange, said resistor forming a parallel electrical circuit with said second and third parts of said at least one resistive wire.

11. The flange according to claim 1, wherein in said second and third parts of said at least one resistive wire the resistive wire is bent along a spiraling path, or multiple lengths of resistive wire are laid out in substantially concentric circles.

12. The flange according to claim 1, wherein said second and third parts of said at least one resistive wire comprises a plurality of petals.

13. The flange according to claim 1, comprising a fastener to fasten said heating surface.

14. A vehicular fluid tank, comprising the flange according to claim 1.

15. The vehicular fluid tank according to claim 14, wherein said flange is placed substantially at the bottom of said vehicular fluid tank.

16. A flange comprising:
a container to hold a quantity of a fluid within a vehicular tank, said quantity of said fluid being part of the fluid present in the tank; and
a heating element including at least one resistive wire to conduct an electrical current and dissipate heat as an effect of said current, wherein
said heating element further includes means for guiding said at least one resistive wire at a plurality of separate locations along a length of the at least one resistive wire and about the container to form at least one heating surface, and wherein at least a first part of said at least one resistive wire is guided inside said container to heat the fluid inside the container, a second part of said at least one resistive wire is guided outside and along an external wall of said container to heat the fluid surrounding the container, and a third part of said at least one resistive wire is guided outside and around a base of said container.

17. A flange comprising:
a container to hold a quantity of a fluid within a vehicular tank, said quantity of said fluid being part of the fluid present in the tank; and
a heating element including at least one resistive wire to conduct an electrical current and dissipate heat as an effect of said current, wherein
said heating element further includes a plurality of guides, wherein said at least one resistive wire is guided at a plurality of separate locations along a length of the at least one resistive wire and about the container by said plurality of guides to form at least one heating surface, and wherein at least a first part of said at least one resistive wire is guided inside said container to heat the fluid inside the container, a second part of said at least one resistive wire is guided outside and along an external wall of said container to heat the fluid surrounding the container, and a third part of said at least one resistive wire is guided outside and around a base of said container, and wherein
at least one of the plurality of guides is remote, at least at one location, from the container.

18. The flange according to claim 1, wherein the fluid is a urea solution.

19. The flange according to claim 16, wherein the fluid is a urea solution.

20. The flange according to claim 17, wherein the fluid is a urea solution.

* * * * *